(No Model.) 2 Sheets—Sheet 1.
J. M. TREAT.
FISH TRAP.
No. 363,263. Patented May 17, 1887.
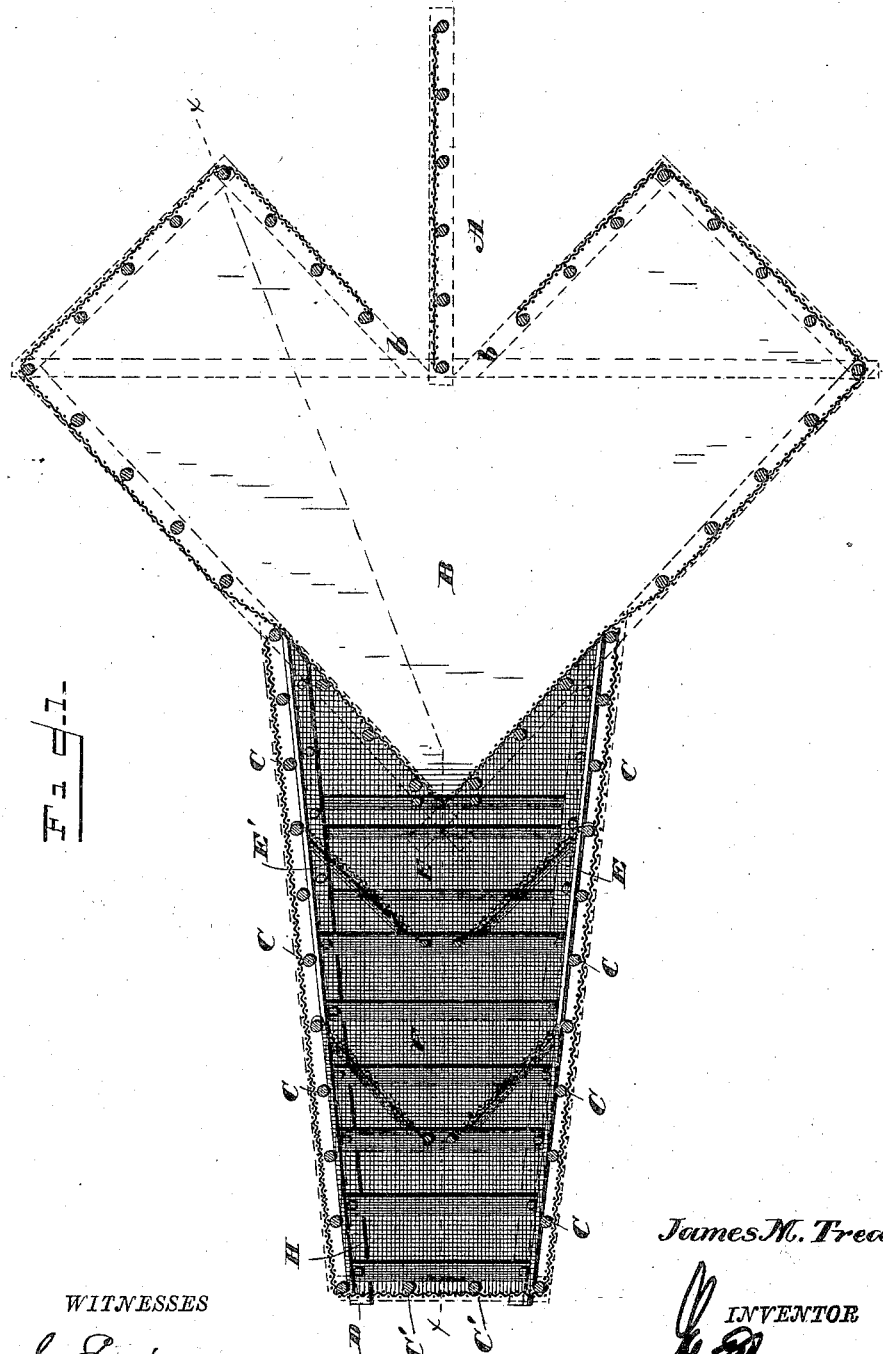
WITNESSES
James M. Treat.
INVENTOR
Attorney

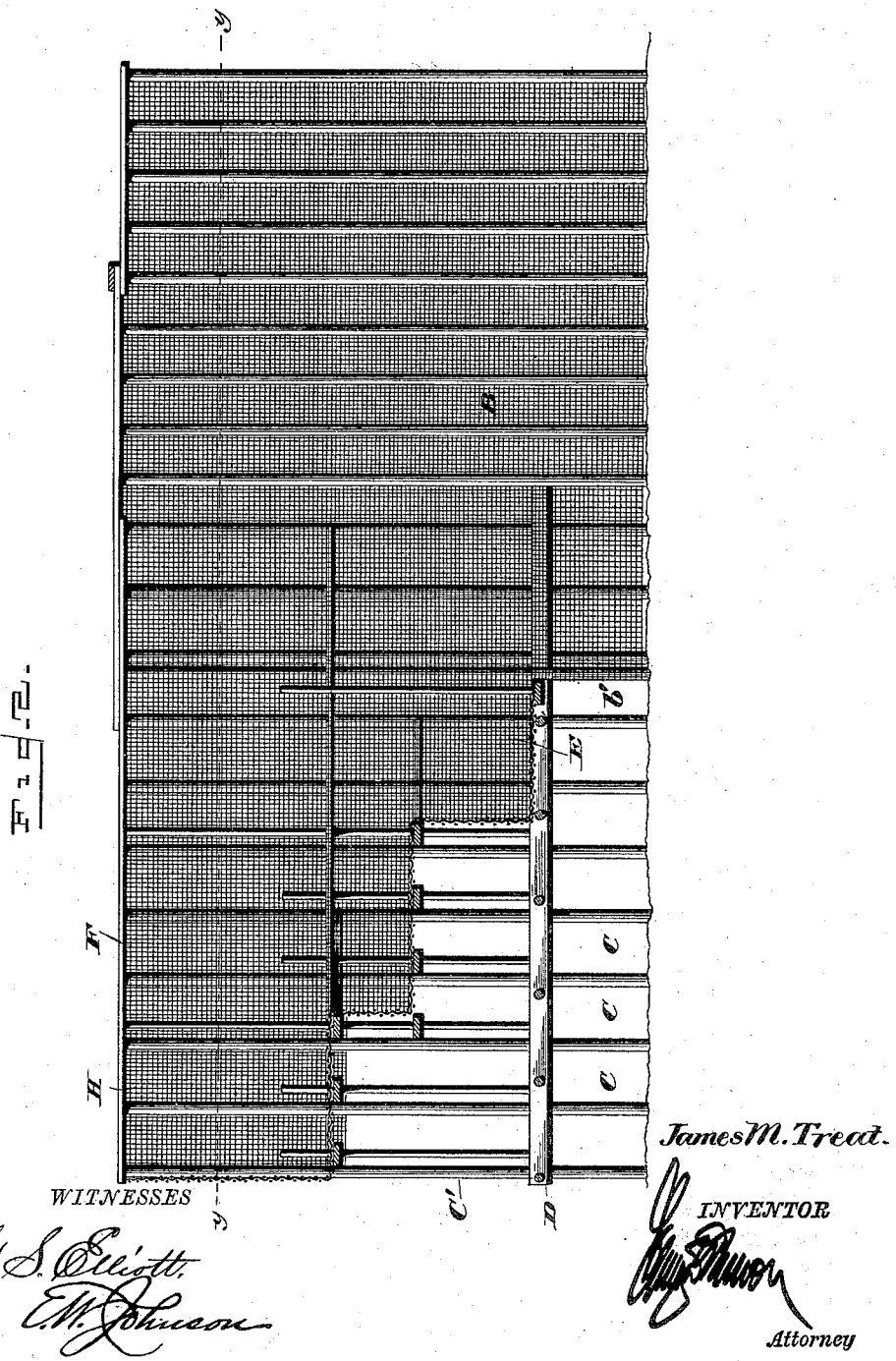

UNITED STATES PATENT OFFICE.

JAMES M. TREAT, OF STOCKTON, MAINE.

FISH-TRAP.

SPECIFICATION forming part of Letters Patent No. 363,263, dated May 17, 1887.

Application filed March 10, 1887. Serial No. 230,412. (No model.)

*To all whom it may concern:*

Be it known that I, JAMES M. TREAT, a citizen of the United States of America, residing at Stockton, in the county of Waldo and State of Maine, have invented certain new and useful Improvements in Fish-Traps; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to certain new and useful improvements in fish pounds or weirs, the object of my invention being to provide a weir or pound the pound and pot of which is provided with floors arranged one above another, so that the use of nets and devices for raising the fish is obviated; and with the above end in view my invention consists in the construction and combination, as will be hereinafter fully set forth, and specifically pointed out in the claims.

In the accompanying drawings, which illustrate my invention, Figure 1 is a plan view of a fish weir or pound constructed in accordance with my invention, and Fig. 2 is a vertical sectional view taken through the line *x x* of Fig. 1.

A refers to the leader, which may be constructed in the usual manner, said leader consisting of a suitable obstruction, which is supported by stakes, said leader terminating at a point opposite the center of the heart, as is usual in stationary pounds of a character similar to my invention.

B refers to the heart, which is provided with openings *b b*, adjacent to the leader, through which the fish pass to enter the same. This heart is attached to vertical stakes and extends from the bottom to a point above the surface of the water, the lower ends of these stakes being planted, while the upper ends are connected to each other by suitable beams. The heart B is provided with a vertical opening at its point, which opening extends from the upper portion of the same to a slight distance above the bottom, the lower portion of the opening, as shown at *b'*, from the bottom to the floor of the first pound, being closed by suitable netting.

C refers to a series of piles or stakes, which extend from the heart substantially parallel with each other, the ends being connected by a series of vertical posts, C'. The upper ends of these posts C and C' are connected to each other by a suitable frame, while the lower ends are driven into the ground, and the upper portions of these posts C and C' to a point corresponding with the depth of the third pound or pot, H, are covered by a suitable netting.

D refers to a suitable frame, which extends from the point of the heart above the transverse netting *b'* to a point beyond the first pound, and this frame-work is suitably attached to the vertical piles, and is provided with a floor, E, from which side wings, E', extend vertically, these side wings extending to the upper edge of the structure. The vertical wings E' and E' converge toward each other, and from a point on a line with the floor of the next pound to the top of the pound an opening is provided, through which the fish may pass from the first pound to the second. The second pound, F, is constructed in a similar manner, and is provided with a floor which is supported on a suitable frame-work, the opening from said pound leading into the last pound or pot, H. The floors of these different pounds are located with respect to the rise and fall of the tide, and they are of sufficient strength and durability to support the weight of one or more persons.

The upper portion of the pound is designed to be located at a point a slight distance above high water, so that the floor of the pound or pot H will be near the low-water level, and the next pound, F, has its floor lower than the floor of the pound H, while the floor of the first pot is located at a considerable distance below the low-water level.

The fish enter the heart as in pounds constructed in the usual manner, and according to the height of the tide enter the first pound, and from thence to the second and then to the pot, according to the stage of the tide. Near low water, when it is desired to enter a pound, the person can stand on the floor of the pot or pound H and dip the fish therefrom, and also dip the fish from the next pound below. When the tide reaches or falls below the next level, the same operation can be gone through with until low tide. By thus constructing the pounds, draw-nets and other movable structures are obviated, and breakage of such nets and consequent loss of fish is obviated.

I claim—

1. In a fish-trap or weir having walls of netting, a series of pounds the floors of which are arranged stepwise at different levels, each pound opening into the next higher one, substantially as shown, and for the purpose set forth.

2. In a weir or fish trap, the combination of two or more pounds rigidly supported on piles and connected to the main pound or heart, said pounds being connected to each other by openings, and provided with floors at different levels, said floors being supported on a rigid frame-work, substantially as shown, and for the purpose set forth.

JAMES M. TREAT.

Witnesses:
L. M. PARTRIDGE,
W. F. GRIFFIN.